Patented Jan. 24, 1950

2,495,292

UNITED STATES PATENT OFFICE 2,495,292

HYDROGENATION OF CARBON MONOXIDE-MONOOLEFIN POLYMERS

Samuel L. Scott, Wilmington, Del., assignor to E. I. du Pont de Nemours & Company, Wilmington, Del., a corporation of Delaware No Drawing. Application September 1, 1944, Serial No. 552,390

15 Claims. (Cl. 260—66)

This invention relates to catalytic hydrogenation processes and more particularly to the catalytic hydrogenation of carbon monoxide-monoolefin polymers.

This invention has as an object the preparation of high molecular weight polyhydric alcohols. A still further object is the preparation of high molecular weight secondary polyhydric alcohols. Another object is to prepare high molecular weight polyhydric alcohols from polymers of carbon monoxide with another polymerizable organic compound. A still further object is to prepare high molecular weight secondary polyhydric alcohol from polymers of ethylene with carbon monoxide. Other objects will be apparent upon the reading of the following description of the invention.

These objects are accomplished by the following invention which comprises reacting with hydrogen a polymer of carbon monoxide with another polymerizable organic compound in the presence of a hydrogenation catalyst, preferably one selected from the group consisting of chromites of metals forming hydrogenating oxides, metallic hydrogenation catalysts prepared by the sodium naphthalene reduction of metallic salt as described in U. S. Patent 2,177,412, and ruthenium oxide.

Since the exact manner of practicing this invention will vary somewhat in the conditions employed depending upon the particular carbon monoxide/polymerizable organic compound polymer used and the catalyst selected, the invention is best described by means of the following specific examples.

Unless otherwise specified parts are by weight.

*Example 1.*—A pressure reactor is charged with 64.6 parts of an ethylene/carbon monoxide polymer having an ethylene/carbon monoxide mole ratio of about 1.5/1, 200 parts of dioxane, and 10 parts of a nickel catalyst prepared as described hereinafter. The reactor is sealed, heated to 175° C. and pressured to 2,500 lb./sq. in. with hydrogen. At the end of 1¾ hours the reactor is allowed to cool, opened, the product discharged, and filtered to remove the catalyst. The product obtained is light colored, pliable and rubbery and has a melting point of about 80° C. Analysis of the material shows it to contain 67.67% carbon, 11.03% hydrogen, a hydroxyl number of 412, a carbonyl number of 166, and an intrinsic viscosity of 0.36 (measured at 25° C. in dimethylformamide at a concentration of 0.1 g./100 ml. of solution). The polymeric alcohol thus obtained is soluble in hot dioxane, chloroform and dimethylformamide, partially soluble in hot xylene and nitrobutane, and insoluble in boiling acetone, methanol and water.

The polymer used in the above example is made as follows:

A pressure reaction vessel is charged with 0.5 part of diethyl peroxide and 100 parts of dioxane, closed, evacuated, charged further with 110 parts of ethylene, and then pressured to 250 atmospheres with carbon monoxide. The temperature of the reaction mixture is raised to 130° C. and maintained at 128–132° C. for 3.5 hours, during which time the pressure is held at 600–700 atmospheres by occasional repressuring with carbon monoxide. The vessel is cooled, excess gases are bled off, and the vessel is opened. The dioxane is removed by steam distillation. The yield of dry polymer is 40 parts. The product melts at 130–140° C. and contains ethylene and carbon monoxide in a mole ratio of 1.5:1.

The nickel catalyst used in the above example is prepared as described in U. S. Patent 2,177,412 by suspending anhydrous nickel chloride, with stirring, in a solution of naphthalene in the dimethyl ether of ethylene glycol. Sodium is added to the reaction mixture and dissolves to form a solution of sodium-naphthalene, which compound immediately reacts with the suspended nickel chloride to form finely divided metallic nickel and sodium chloride. After the equivalent quantity of sodium has reacted, the mixture is filtered and the solid portion washed free from naphthalene with fresh dimethyl ether of ethylene glycol; the sodium chloride is then separated from the nickel by washing with water. The elementary nickel thus obtained is in a fine state of subdivision and before stabilization by exposure to an oxygen containing atmosphere and/or conditions such that the temperature of the catalyst mass does not rise about 25° C., is pyrophoric.

*Example 2.*—A pressure reactor is charged with 10 parts of an ethylene/carbon monoxide polymer, prepared as described in Example 1 and containing a mole ratio of ethylene to carbon monoxide of 1.3:1, 150 parts of dioxane and 5 parts of a barium modified copper chromite catalyst, prepared as described hereinafter. The reaction mixture is heated to 270° C. and pressured with hydrogen to 2,500 lb./sq. in. After 3 hours the reactor is allowed to cool, opened, and the contents discharged. The product obtained is a sticky, viscous, light yellow material containing 72.23% carbon, 10.91% hydrogen, a hydroxyl number of 140, and an iodine number of 31.

The urethane of the polyhydric alcohol prepared as described above is made by heating to reflux a mixture of 2.7 parts thereof, 5 parts of phenyl isocyanate, and 60 parts of xylene for 14 hours. The product obtained, after removal of the solvent and excess phenyl isocyanate by steam distillation, is found to contain 70.44% carbon, 8.68% hydrogen, and 2.32% nitrogen.

The polymer used in the above example is made as follows:

A pressure reaction vessel is charged with 0.5 part of diethyl peroxide and 100 parts of dioxane, closed, evacuated, and pressured to 300 atmospheres with a mixture of carbon monoxide and ethylene containing 30% carbon monoxide by weight. The temperature of the reaction mixture is raised to 130° C. and maintained at 128 to 131° C. for 5 hours, during which time the pressure is held at 600 to 700 atmospheres by occasional repressuring with the ethylene-carbon monoxide mixture. The vessel is cooled, bled of excess gases, and opened. The dioxane is removed by steam distillation. The yield of dry polymer is 110 parts. The product melts at 130 to 140° C. and contains ethylene and carbon monoxide in a mole ratio of 1.3:1.

The barium modified copper chromite catalyst used in the above example is prepared as described in U. S. 2,079,414 by dissolving 26 parts of barium nitrate and 218 parts of cupric nitrate in 800 parts of water at 70° C. and adding thereto with stirring a solution of 126 parts of ammonium bichromate and 150 parts of 28% ammonium hydroxide in 600 parts of water. The precipitate is filtered, dried, and ignited at 400° C.

*Example 3.*—A high pressure reaction vessel is charged with 10 parts of an ethylene/carbon monoxide polymer similar to that of Example 2, made in a 20/80 benzene/dioxane medium. The polymer is hydrogenated in 150 parts of dioxane at 270° C. and 2500 lbs./sq. in. hydrogen pressure, using 7 parts of an acetic acid extracted zinc chromite hydrogenation catalyst prepared as described hereinafter. The product obtained is a yellow, viscous, sticky oil which by analysis is found to contain 75.2% carbon, 11.1% hydrogen, and an hydroxyl number of 112.

The zinc chromite catalyst used in the above example is prepared as described in U. S. 1,746,782 by heating basic zinc chromate containing 42.5% by weight of zinc and 25% chromium for 4 hours in air at a temperature of 800 to 900° C. after which the product is cooled and extracted with 10% acetic acid until no more zinc is removed. The resulting product contains about 35% zinc, and 39% chromium.

*Example 4.*—A high pressure reactor is charged with 10 parts of the ethylene/carbon monoxide polymer of Example 1, 5 parts of a nickel chromite catalyst, and 150 parts of dioxane. The reactor is closed, heated to 225° C., and pressured with hydrogen to 2500 lb./sq. in. The product obtained is rubbery in nature and contains 67.67% carbon, 8.43% hydrogen, and has an hydroxyl number of 145.

A urethane is prepared from the above alcohol as described in Example 3. The urethane analyzes 72.36% carbon, 7.22% hydrogen and 3.34% nitrogen.

The nickel chromite catalyst used in the above example is prepared according to U. S. 2,077,421 as follows.

Two hundred ninety parts of nickel nitrate is dissolved in about 2000 parts of water and treated with an equal volume of water containing 194 parts of potassium chromate. The mixture is heated to 90° C. and treated with a solution containing 56 parts of potassium hydroxide. The precipitate is decanted, washed, dried, and heated at a dull red heat for 4 hours, after which it is cooled and again washed to free it of the last of the potassium chromate set free by the ignition. The resulting product is then reduced with hydrogen at 500° C.

*Example 5.*—A pressure reactor is charged with 10 parts of the ethylene/carbon monoxide polymer of Example 2. The polymer is hydrogenated in 150 parts of dioxane at 175° C. at 2500 lb./sq. in. pressure, using 2.5 parts of ruthenium dioxide as a catalyst. The product is a brown, high melting alcohol analyzing 66.9% carbon, 9.84% hydrogen, hydroxyl number 370, and with an intrinsic viscosity of 0.45 (measured at a concentration of 0.1 g./100 ml. dimethylformamide at 25° C.).

*Example 6.*—A high pressure reactor is charged with 70 parts of a propylene/ethylene/carbon monoxide polymer containing 40% by weight of carbon monoxide. The polymer is hydrogenated in 200 parts of dioxane at 175° C. and 2500 lb./sq. in. pressure, using 7 parts of the nickel catalyst prepared as described in Example 1. After reaction is complete, as evidenced by cessation of hydrogen absorption, the reactor is cooled, opened, and the contents discharged. The product obtained is light colored, melts at about 125° C., is pliable and rubbery and analyzes 70.61% carbon, 10.73% hydrogen, has a hydroxyl number of 387, a carbonyl number of 167, and an intrinsic viscosity of 0.77 (measured at a concentration of 0.5 g./100 ml. meta-cresol at 25° C.). The product is soluble in hot dioxane, dimethylformamide, nitrobutane and chloroform, partially soluble in hot xylene, acetone and methanol, and insoluble in boiling water and carbon tetrachloride.

A pressed film of the polymer is found to have a tensile strength of 230 lb./sq. in., an elongation at break of 356%, and a zero tensile strength temperature of 78° C. The film has a dielectric constant of 8.25 and a power factor of 0.0947.

The propylene/ethylene/carbon monoxide polymer used in the above example is prepared by charging a reaction vessel with 0.5 part of diethyl peroxide, 100 parts of thiophene-free benzene, closing the vessel, evacuating it, charging it further with 24 g. of propylene, and then pressuring to 400 atmospheres with a mixture of carbon monoxide and ethylene containing 30% carbon monoxide by weight. The mixture is heated to 130° C. and maintained at 129° to 132° C. for 15 hours, during which time the pressure is maintained at 850 to 1000 atmospheres by occasional repressuring with the ethylene/carbon monoxide mixture. After there is no further drop in pressure, the reaction vessel is cooled, and excess gas bled off. The polymer is milled on a hot rubber roll to remove benzene. The yield of polymer is 60 parts. The product contains 40% by weight of carbon monoxide.

*Example 7.*—A pressure reactor is charged with 36.5 parts of a propylene/ethylene/carbon monoxide polymer containing 37% carbon monoxide by weight and hydrogenated in 150 parts of dioxane at 175° C. and 2500 lb./sq. in. pressure using 5 parts of the nickel catalyst described in Example 1. The product obtained is light colored, melts at about 80° C. and by analysis is found to contain 69.57% carbon, 10.83% hydrogen, and to have a hydroxyl number of 477 and an intrinsic viscosity of 0.38 (measured at a concentration of 0.5 g./100 ml. of meta-cresol at 25° C.). The product is soluble in hot dioxane, chloroform and xylene, partially soluble in hot acetone, and insoluble in boiling water and methanol.

The polymer used in the above example is prepared as follows:

A pressure reactor is charged with 0.5 part of diethyl peroxide and 100 parts of thiophene-free benzene, closed, and evacuated. Then 80 parts of propylene is added and the vessel is pressured to 500 atmospheres with a mixture of ethylene and carbon monoxide containing 70% by weight of carbon monoxide. The temperature of the reaction mixture is raised to 130° C. and maintained at 128 to 130° C. for 16 hours, during which time the pressure is kept at 860 to 1000 atmospheres by occasional repressuring with the mixture of ethylene and carbon monoxide. The vessel is thereafter cooled, the excess gases are bled off, and the vessel is opened. The polymer yield is 26 parts. The product contains 37% by weight of carbon monoxide.

*Example 8.*—A pressure reactor is charged with 28 parts of a propylene/ethylene/carbon monoxide polymer containing 40% carbon monoxide by weight and made as described in Example 6. The polymer is hydrogenated in 200 parts of dioxane at 160 to 190° C. at 2500 lb./sq. in. pressure, using 5 parts of a barium modified copper chromite catalyst prepared as described in U. S. Patent 2,079,414 with the exception of being extracted with ammoniacal ammonium nitrate according to U. S. 2,129,507. The product is light colored, and analyzes to 68.81% carbon, 9.64% hydrogen, has hydroxyl number of 178, and an intrinsic viscosity of 0.76 (measured at a concentration of 0.5 g./100 ml. of meta-cresol at 25° C.). Pressed films of this product have a tensile strength of 1490 lb./sq. in., an elongation at break of 24%, and a zero tensile strength temperature of 100° C.

*Example 9.*—A pressure reactor is charged with 10 parts of a propylene/ethylene/carbon monoxide polymer containing 43% carbon monoxide and hydrogenated in 150 parts of dioxane at 160° C. and 2500 lb./sq. in. pressure using 7 parts of a copper chromite-on-kieselguhr catalyst. The product obtained analyzes 69.65% carbon, 10.03% hydrogen and has a hydroxyl number of 196.

The catalyst used in the above example is prepared as described in U. S. Patent 1,746,782.

*Example 10.*—A pressure reactor is charged with 25 parts of an ethylene/carbon monoxide polymer having an ethylene/carbon monoxide mole ratio of 45:1 and made as described below. The polymer is hydrogenated in 200 parts of decahydronaphthalene at 175° C. and 2500 lbs./sq. in. pressure, using 5 parts of nickel catalyst prepared as described in Example 1. The product obtained melts at about 175° C. and is soluble in hot xylene and decahydronaphthalene, partially soluble in boiling dioxane, and insoluble in boiling water, ether and acetone. Analysis of the product shows it to contain 84.43% carbon and 13.43% hydrogen. Pressed films have a tensile strength of 2460 lbs./sq. in., and elongation at break of 383%, a stiffness of 28,400 lbs./sq. in. and a zero tensile strength temperature of 278° C.

The polymer used in the above example is made by charging a pressure reactor with 0.1 part of diethyl peroxide and 100 parts of thiophene-free benzene. The reactor is closed, evacuated and pressured to 400 atmospheres with a mixture of carbon monoxide and ethylene containing 1% carbon monoxide by weight. The temperature of the reaction mixture is raised to 120° C. and maintained at 116 to 121° C. for 18.5 hours, during which time the pressure maintained at 850 to 1000 atmospheres by occasional repressuring with the mixture of carbon monoxide and ethylene. After reaction is complete, as evidenced by cessation of pressure drop, the vessel is cooled, bled of excess gas and opened. There is recovered 77 parts of a polymer having an ethylene/carbon monoxide mole ratio of 45:1.

In general, the compounds polymerized with the carbon monoxide are those which contain the group >C=C<. These compounds are capable of undergoing a polymerization reaction involving addition across the ethylene double bond, which reaction is catalyzed by peroxy compounds. These polymerizable organic compounds include any organic compound, such as the monoolefins, containing ethylenic unsaturation and capable of being polymerized through the ethylenic double bond, as, for example, ethylene, propylene, the butylenes, butadiene, vinyl fluoride, organic vinyl esters such as vinyl propionate, vinyl benzoate, vinyl acetate, vinyl isobutyrate, vinyl laurate, etc., vinyl ketones such as methyl vinyl ketone, methyl isopropenyl ketone, styrene, acrylic and methacrylic acids and their derivatives such as their esters, nitriles and anhydrides, diallyl compounds such as diallyl phthalate, maleic and fumaric acid esters and maleic anhydrides, etc.

Combinations of a monoolefinic hydrocarbon such as ethylene with one or more additional polymerizable organic compounds are particularly useful for polymerization with carbon monoxide. Organic compounds which contain at least one terminal methylene group are preferred for polymerization with carbon monoxide since the most satisfactory results with respect to yield and polymer quality are obtained when such compounds are used.

Generally, the polymers used in the practice of this invention are formed by polymerizing carbon monoxide with a polymerizable organic compound containing ethylenic unsaturation in the presence of a peroxy catalyst and in the absence of a Friedel-Crafts catalyst to yield normally solid polymers. In the preferred mode of operation, the polymerizable organic compound and carbon monoxide are heated together under pressure in the presence of an organic peroxide catalyst and in the absence of a Friedel-Crafts type compound. The polymerization can be carried out either as a batch, semi-continuous, or continuous operation. It is generally conducted in vessels which are either constructed of or lined with glass, stainless steel, silver, etc.

By "peroxy compound" is meant any compound which contains the bivalent radical —O—O—. Examples of such compounds are oxygen, benzoyl peroxide, lauroyl peroxide, succinyl peroxide, diphthalic acid peroxide, dioxane peroxide, diethyl peroxide, peracetic acid, perbenzoic acid, potassium peroxy disulfate, ammonium peroxy disulfate, sodium and potassium percarbonates, and the like.

The concentration of catalyst required is generally from 0.01 to about 1% based on the amount of polymerizable monomer.

Although in the examples there has been indicated certain definite conditions of temperature, pressure, concentration, duration of reaction, catalyst concentration, etc., it is to be understood that these values may be varied somewhat within the scope of this invention since the conditions of each experiment are determined by the particular polymer being treated, the quantity used, and the catalyst employed.

In general, the process of this invention is operable at temperatures ranging from 75° to 350° C. and at pressure ranging from atmospheric to a maximum determined by the particular limitations of the reaction vessel. It is advisable, however, to maintain a pressure higher than atmospheric, generally from 1000 to 15,000 lbs./sq. in. Particularly good results are obtained employing pressures ranging from 2000 to 5000 lbs./sq. in., since under these pressure conditions the reaction proceeds at a practicable rate with maximum yields of desired products. The use of a temperature below 100° C. is not generally desirable since the rate of reaction is too slow. Accordingly, the process is generally operated at temperatures above 150° C., preferably between 170° and 300° C. since under these temperature conditions the reaction proceeds at a practical rate with the production of maximum yields of desired products.

In the practice of this invention any hydrogenation catalyst can be used. The preferred catalysts include ruthenium dioxide, finely divided metals prepared in accordance with the teachings in U. S. 2,177,412, and chromites of metals forming hydrogenating oxides. The preferred chromites are copper chromite, zinc chromite, nickel chromite, promoted chromites such as copper barium chromite, zinc copper cadmium chromite, copper magnesium chromite, and the like.

The amount of catalyst generally ranges from 10% to 70% on the weight of the polymer charged into the reactor.

The process is generally operated in the presence of a solvent and as such may be used dioxane, saturated hydrocarbons and the like. Of these a preferred solvent is 1,4-dioxane since it is a very effective solvent for certain of the polymers used in the practice of this invention, particularly the normally solid carbon monoxide-ethylene polymers.

As shown by the analyses given in the examples, it is evident that the hydrogenated carbon monoxide-ethylene polymers of the present invention contain the ethylene/carbon monoxide chain, with a substantial part of the carbonyl content reduced to hydroxyl.

The process of this invention is used for the preparation of high molecular weight polymeric alcohols which are valuable per se, and which are particularly useful as intermediates in the manufacture of other important products.

I claim:

1. A process for the treatment of interpolymers which comprises hydrogenating an ethylene-carbon monoxide interpolymer, having an ethylene/carbon monoxide ratio within the range of 1.3/1 to 45/1, in the presence of from 10% to 70%, based on the weight of the said interpolymer, of a hydrogenation catalyst, with hydrogen under superatmospheric pressure at a temperature within the range of 75° C. to 350° C., whereby a hydrogenation product comprising an ethylene-carbon monoxide polymeric chain with carbonyl groups reduced to secondary alcohol groups is obtained.

2. A process for the treatment of interpolymers which comprises hydrogenating in a dioxane solvent a normally solid ethylene-carbon monoxide interpolymer, having an ethylene/carbon monoxide ratio of 1.5, in the presence of a nickel hydrogenation catalyst, with hydrogen under 2500 lbs. per sq. in. pressure at a temperature of 175° C., for 1¾ hours, whereby a part of the carbonyl content of the said polymer is reduced to hydroxyl, and a pliable rubbery product is obtained.

3. A process for the preparation of high molecular weight polyhydroxy alcohols which comprises hydrogenating in 1,4-dioxane solution a normally solid carbon monoxide-ethylene interpolymer with hydrogen under superatmospheric pressure in the presence of a hydrogenating catalyst at a temperature within the range of 75° C. to 350° C.

4. The hydrogenation product of a normally solid ethylene/carbon monoxide interpolymer, said hydrogenation product being characterized in that it contains a plurality of substituent hydroxyl groups formed by reduction of the carbonyl groups of the said interpolymer by the said hydrogenation.

5. A process for preparing high molecular weight polyhydroxy alcohols which comprises hydrogenating an interpolymer of carbon monoxide and a polymerizable substance having ethylenic unsaturation, in the presence of a solvent for the said interpolymer and in the presence also of a hydrogenating catalyst at a temperature within the range of 75° to 350° C. under superatmospheric pressure, and thereafter separating from the resulting mixture the polyhydroxy alcohol produced by the said hydrogenation.

6. A process for preparing high molecular weight polyhydroxy alcohols which comprises hydrogenating an interpolymer of carbon monoxide with a monoolefin hydrocarbon having from 2 to 3 carbon atoms per molecule, said interpolymer being dissolved in a solvent, in the presence of a hydrogenating catalyst at a temperature within the range of 75° to 350° C. under a pressure of 1000 to 15,000 pounds per square inch, and thereafter separating from the resulting mixture the polyhydroxy alcohol produced by the resulting reaction.

7. The process of claim 6 in which the said solvent is 1,4-dioxane.

8. The process of claim 6 in which the said solvent is a hydrocarbon.

9. The process of claim 6 in which the hydrogenating catalyst is nickel.

10. The process of claim 6 in which the hydrogenating catalyst is copper chromite.

11. The process of claim 6 in which the said catalyst is ruthenium dioxide.

12. The process of claim 6 in which the said interpolymer is an ethylene/carbon monoxide interpolymer.

13. A polyhydric alcohol, characterized in that it is the hydrogenation product of an interpolymer of carbon monoxide with an ethylenically unsaturated compound, and further characterized in that the hydroxyl groups contained therein are produced by reduction of the carbonyl groups in the said interpolymer by the said hydrogenation, in accord with the process of claim 5.

14. A polyhydroxylated polymeric product, characterized in that it is the hydrogenation product of a normally solid ethylene-carbon monoxide interpolymer, and further characterized in that the hydroxyl groups contained therein are produced by reduction of the carbonyl groups in the said interpolymer by the said hydrogenation, the mole ratio of ethylene/carbon monoxide in the said interpolymer being 1.3:1.

15. A polyhydroxylated polymeric product, characterized in that it is the hydrogenation product of an interpolymer of carbon monoxide with an olefin hydrocarbon having two to three carbon atoms per molecule and further characterized in that the hydroxyl groups contained therein are secondary hydroxyl groups produced by reduction of the carbonyl groups in the said interpolymer by the said hydrogenation.

SAMUEL L. SCOTT.

REFERENCES CITED

The following references are of record in the file of this patent:

UNITED STATES PATENTS

| Number | Name | Date |
|---|---|---|
| 2,080,419 | Green | May 18, 1937 |
| 2,121,367 | Schiller | June 21, 1938 |
| 2,327,066 | Roelen | Aug. 17, 1943 |
| 2,351,120 | Hanford | June 13, 1944 |